Feb. 18, 1947. P. B. RICHARDSON 2,416,221
VENDING MACHINE
Filed May 12, 1944 3 Sheets-Sheet 1
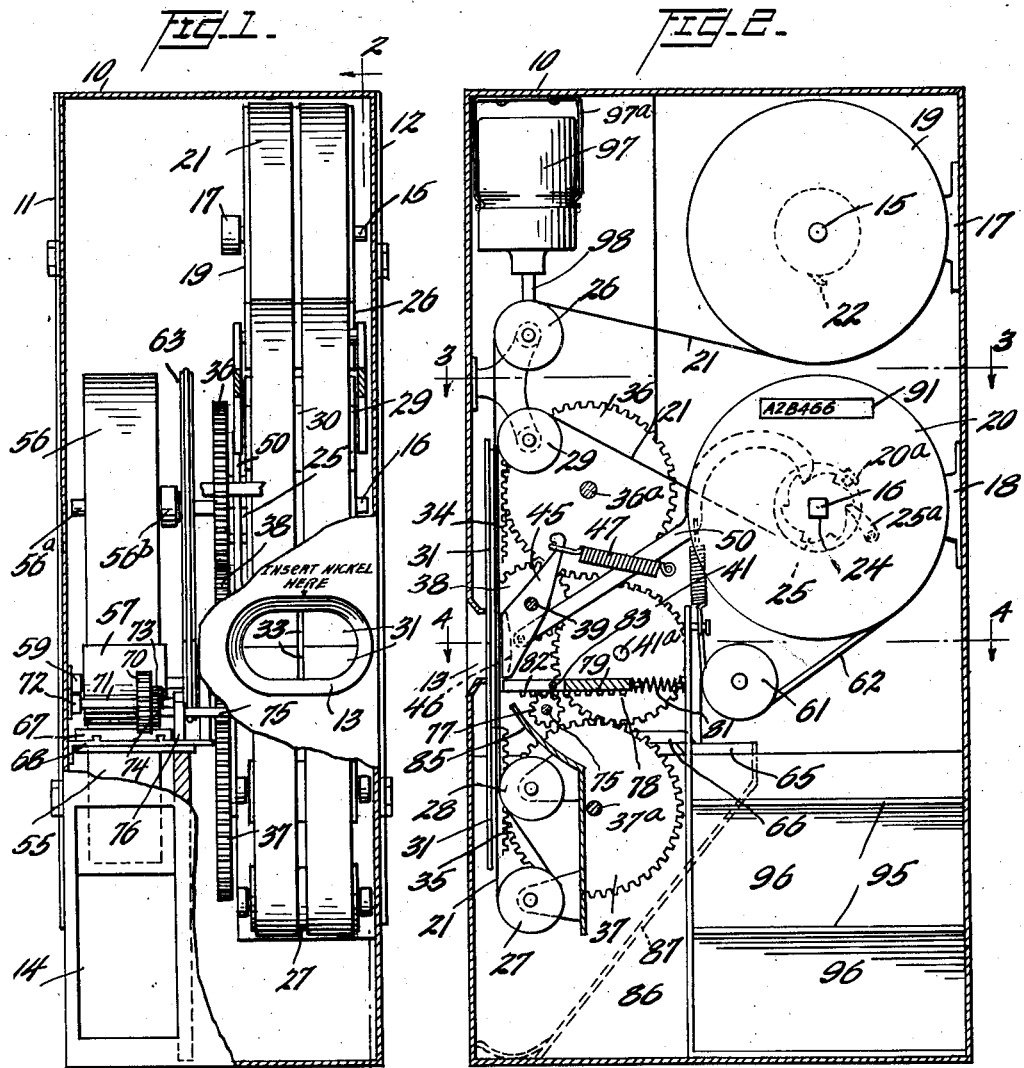
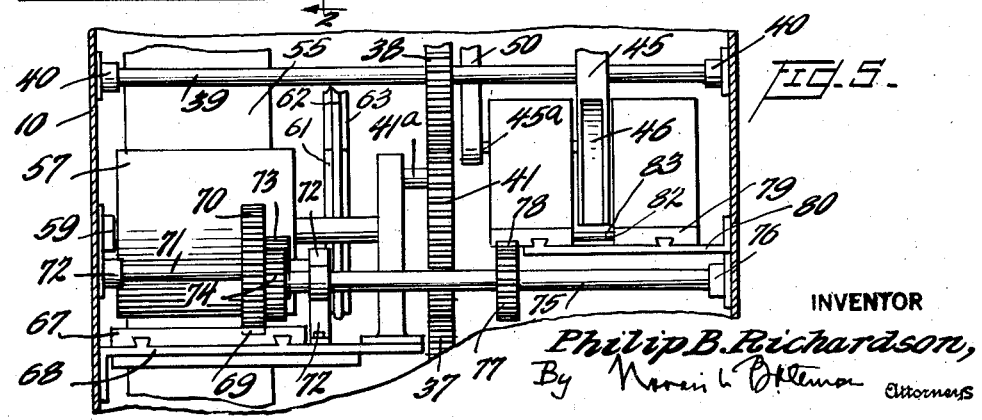
INVENTOR
Philip B. Richardson,
By
Attorneys

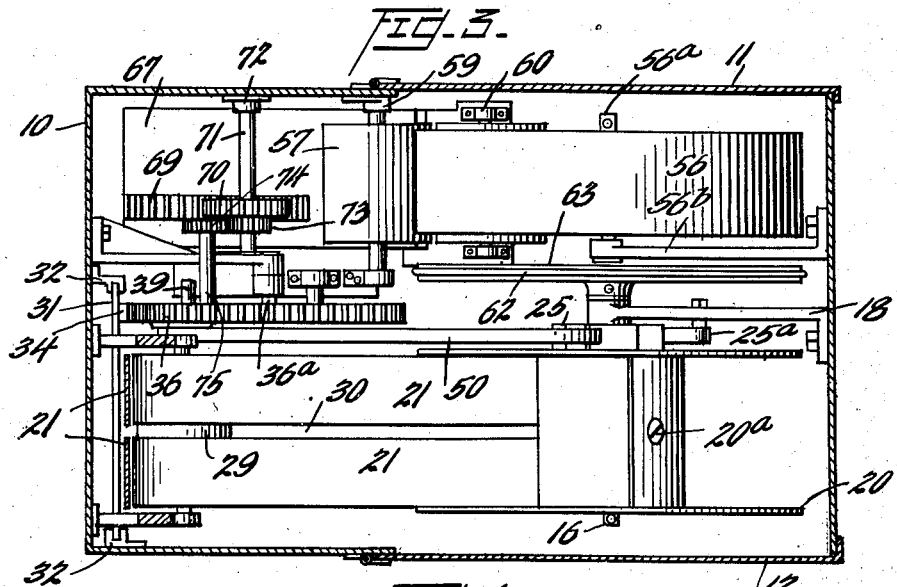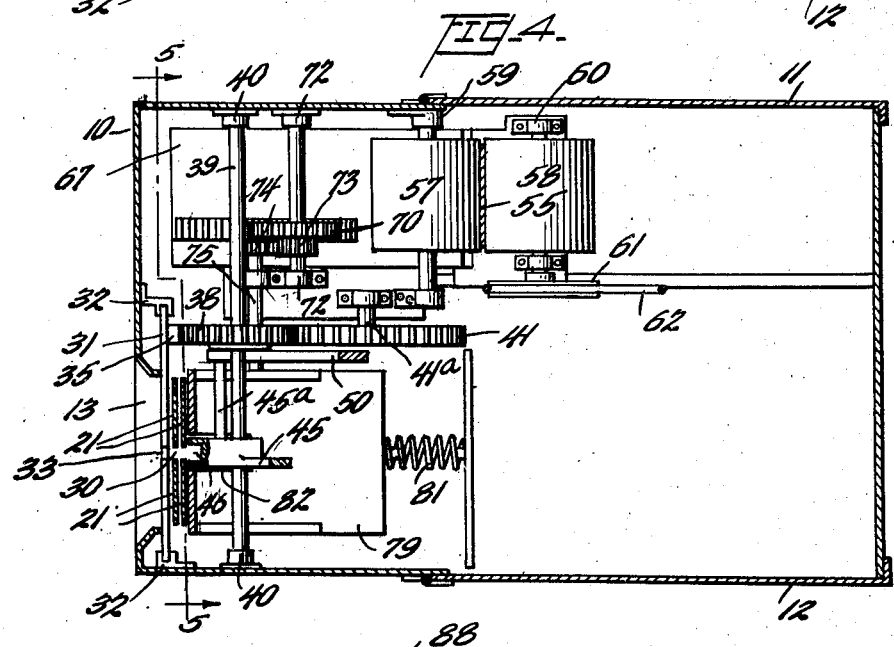

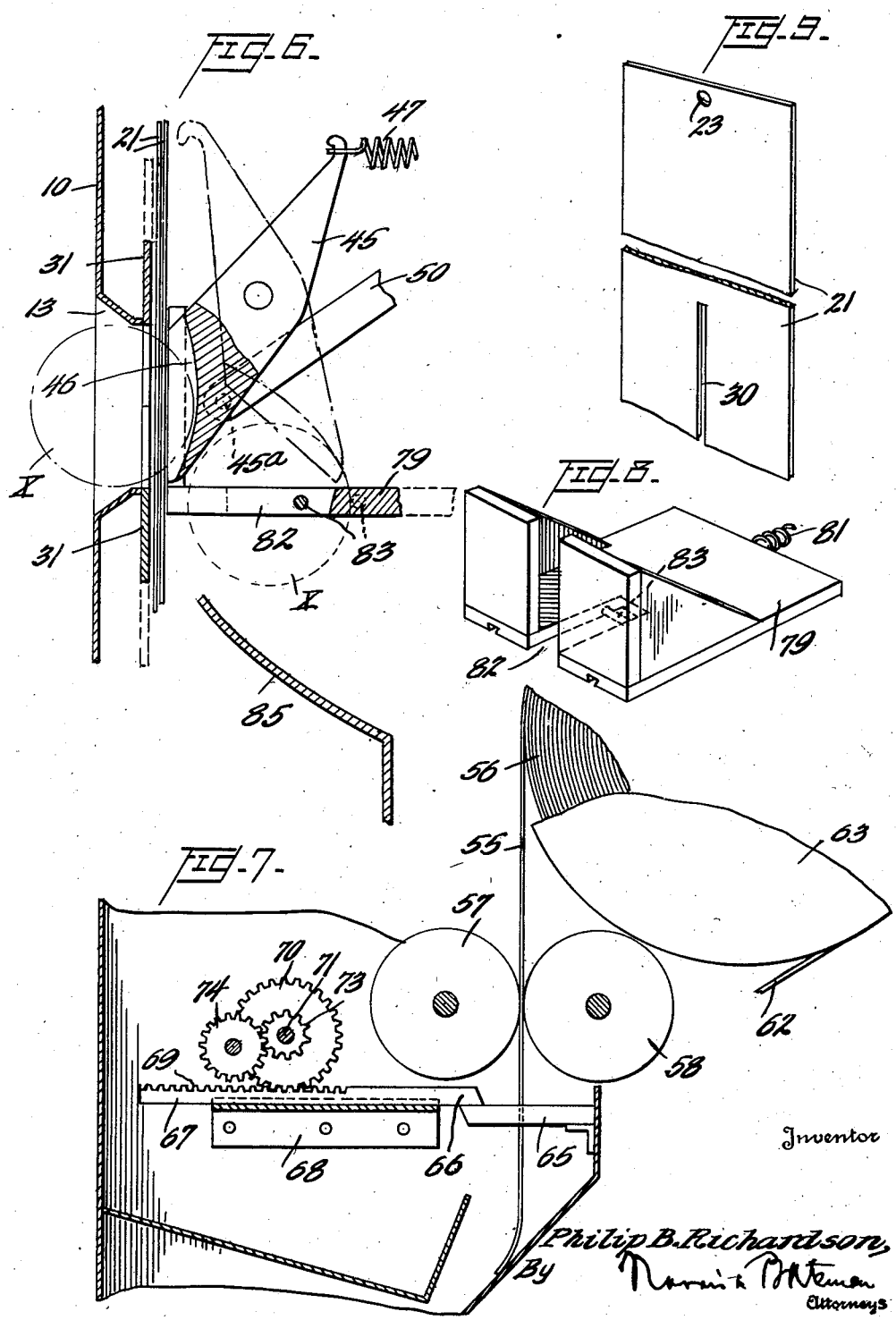

Patented Feb. 18, 1947

2,416,221

UNITED STATES PATENT OFFICE 2,416,221

VENDING MACHINE

Philip B. Richardson, Montclair, N. J., assignor to Richardson Scale Company, Clifton, N. J., a corporation of New Jersey Application May 12, 1944, Serial No. 535,291

16 Claims. (Cl. 194—72)

1

The present invention relates to vending machines, and the primary object is to provide a coin-controlled machine for vending or issuing tickets or the like which records finger-print identifications of the persons to whom are issued tickets such as may represent insurance policies purchased by such persons.

Heretofore, insurance policies underwriting the purchasers against accident or other risks have been sold to travellers by ticket sellers in railroad and bus terminals, but due to greatly increased passenger traffic and consequent lack of time, such sale of insurance policies has become inconvenient.

The present invention overcomes this difficulty by providing a machine which may be operated by the insurance purchaser by inserting a coin, and which automatically delivers a ticket representing an insurance policy. By placing one or more of such machines in a railroad or bus terminal or other convenient location, travellers may purchase insurance and receive tickets in evidence thereof quickly and with facility, and without consuming the time of the ticket sellers.

According to the present invention, the delivery of a ticket representing an insurance policy is controlled by insertion of a coin of proper value, and means is provided for recording the finger print of the insurance purchaser for identification in the event of accident or death and a claim is made under the policy. By providing the tickets with consecutive serial numbers, and with an appropriate marking, as for example, a number, corresponding with the serial number of the machine issuing the tickets, the particular machine which contains the finger print of the purchaser of a particular ticket may be readily ascertained, and by providing the tickets with symbols indicating the location of the machine which issued them, such may be readily located.

In the accompanying drawings, which show the preferred embodiment of the invention—

Figure 1 is a view of the machine from the front, partly in elevation and partly in section.

Figure 2 is a vertical section, taken on the line 2—2 in Fig. 1.

Figure 3 is a horizontal section taken on the line 3—3 in Fig. 2.

Figure 4 is a horizontal section taken on the line 4—4 in Fig. 2.

Figure 5 is a vertical section on an enlarged scale, taken on the line 5—5 in Fig. 4.

Figure 6 is a detail vertical section, on an enlarged scale, taken through the coin-receiving and tape exposing aperture and adjacent elements for advancing the tape and ticket strip and for actuating the ticket severing means.

Figure 7 is a detail view of the ticket severing means.

Figure 8 is a detail perspective view of the coin operated slide for actuating the ticket severing means.

Figure 9 is a detail perspective view of a portion of one of the finger-print receiving tapes.

Figure 10 illustrates a form of ticket that may be used to represent an insurance policy.

Similar parts are designated by the same reference characters in the several views.

The machine, as shown in the present instance, comprises a casing 10, preferably of substantially rectangular form, having doors 11 and 12 hinged or otherwise movably mounted in its respective sides to provide access thereto by an authorized attendant, these doors being provided with any suitable means for locking them and thereby preventing unauthorized access to the interior of the machine. The front wall of the casing is provided with an aperture 13 for insertion of a coin, and with an opening 14 through which the tickets issued by the machine may be removed by the purchaser.

Upper and lower spindles 15 and 16 are suitably mounted within the casing, as by brackets 17 and 18 secured to the back wall of the casing, these spindles being adapted to receive respectively a rewinding spool 19 having a lug 22 to engage in a hole 23 in one end of the tape 21, and one of a suitable number of spools 20 each containing a tape 21 which is permanently attached thereto as by a screw 20$^a$. The spools 19 and 20 are accessible for mounting on and removal from the spindles while the door 12 is open. The tape is composed of a material capable of easily receiving and recording finger prints, and is preferably of a nature which permits the finger prints to be erased or removed therefrom and thus enables the tape to be used repeatedly, as for example, a flexible strip of chromium-plated steel or other metal. The spindle 15 may be round so that the spool 19 will be freely rotatable thereon, but the spindle 16 is adapted to have a spline connection with the spools 20, it being, for example, square or of other angular cross section, and each of the spools 20 has a central hole 24 which is of correspondingly square or angular cross section, so that each spool 20 may be applied endwise to this spindle and will be connected thereto to rotate with it. The spindle 16 is mounted rotatably in its bracket 18, and has a ratchet wheel 25 fixed thereto, this ratchet wheel being rotated step-by-step by means hereinafter described, to unwind the tape 21 from the upper spool 19 and wind it on the lower spool 20, a pawl 25a pivoted on the bracket 18 cooperating with the ratchet wheel to prevent retrograde or unwinding rotation of the lower or winding spool 20.

The finger-print receiving tape 21 is threaded in the machine to extend from the upper spool 19 to and over an idler roller 26, thence downwardly within the casing past the aperture 13 to and beneath an idler roller 27, thence in front of a pair of idler rollers 28 and 29 mounted respectively below and above the aperture 13, thus bringing the portion of the tape between the rollers 28 and 29 immediately behind the portion of the tape which extends between the rollers 26 and 27, and the tape passes over the roller 29 to the lower spool 20 for winding thereon. The tape 21 is provided preferably midway of its width with a slot 30 which extends continuously lengthwise thereof to points adjacent to its ends.

The portion of the tape which lies immediately behind the aperture 13 is normally covered and concealed to prevent tampering with the tape, but this portion of the tape is automatically uncovered to receive a finger-print when a coin is inserted. Such tape covering means comprises preferably a shutter embodying a pair of members 31 mounted respectively above and below the aperture 13 and slidable in suitable guides 32 fixed to the inner side of the front wall of the casing, the proximate edges of the shutter members being arranged to abut and thereby close the aperture 13, but leaving a coin receiving slot 33 which registers with the slot 30 in the tape 21, the slot 33 being formed partly in each of the shutter members.

The shutter members 31 are connected for simultaneous movement in opposite directions to cover or uncover the tape, the upper and lower shutter members being provided for this purpose with racks 34 and 35 respectively which mesh with gears 36 and 37 suitably mounted on fixed axes 36a and 37a within the casing, the gear 36 meshing with an actuating gear 38 fixed on a shaft 39 journaled in suitable bearings 40 suitably fixed in the casing, the gear 38 being connected to the gear 37 through an intermediate gear 41 suitably mounted on a fixed axis 41a within the casing. The gearing thus provided causes the shutter members to move simultaneously in opposite directions to uncover the tape 21 and render it accessible through the aperture 13 when the gear 38 is rotated in one direction, and to move in reverse directions to cover or conceal the tape when the gear 38 is rotated in the opposite direction.

The shutter actuating gear 38 is operated by a coin when inserted through the aperture 13 and the slots 33 and 30 in the shutter members and tape respectively. For this purpose, an arm 45 is fixed to the shaft 39 to rotate it and the gear 38 fixed thereto, this arm having a recess 46 in its forward edge which is alined or in the same vertical plane with the slots 30 and 33 and is normally held by a tension spring 47 in a position immediately behind said slots. By this arrangement, when a coin is inserted edgewise through the slot 33 in the shutter members and the slot 30 in the tape 21, it will engage in the recess 46 in the forward edge of the arm 45, and as the coin is pressed inwardly, the arm 45 will be rotated in a direction against the action of its spring 47, thus rotating the gear 38 and the gears 36 and 37 connected thereto to retract the shutter members and open the shutter, thus exposing the portion of the tape 21 which is immediately behind the aperture 13. The final portion of the operation of pushing the coin through the slots 30 and 33 and against the arm 45 will bring the thumb or other finger of the purchaser into contact with the tape 21, thereby producing a finger-print thereon. Release of the coin from the arm 45, as hereinafter described, permits the spring 47 to return said arm to its normal position and return of the shutter members to their normal closed positions.

The coin-operated arm 45 is also preferably utilized to advance the tape 21 to bring a fresh or unexposed portion thereof opposite to the aperture 13 after receiving each finger print thereon, the arm 45 being pivotally connected for such purpose by a pin 45a to a pawl 50 the free end of which rests on the ratchet wheel 25. By this arrangement, each time the arm 45 is pushed inwardly by an inserted coin, the end of the pawl 50 will ride from one tooth to the next following tooth of the ratchet wheel 25 while the latter is held from retrograde rotation by the pawl 26, and when the arm 45 swings back to its normal forward position under the action of the spring 47, the pawl 50 will pull the ratchet wheel 25 around through one step, thereby causing the lower spool 20 to wind a suitable length of the tape onto this spool and to unwind a corresponding length of tape from the upper spool.

The insertion of a coin as hereinbefore described is also preferably utilized to effect the delivery of a ticket or slip which represents or is evidence of the purchase of an insurance policy. In the present instance, such tickets, an example of which is shown in Fig. 10, are printed on a continuous strip 55 which is wound into a roll 56 which may be mounted rotatably on a spindle 56a supported by a bracket 56b suitably mounted in fixed position within the casing, this roll being accessible by opening the door 11. The ticket strip 55 is led from the roll and then between a pair of feed rollers 57 and 58 rotatably mounted in suitable relatively fixed bearings 59 and 60 within the casing, the shaft to which the roller 58 is fixed having a pulley 61 fixed thereon and cooperating with a belt 62 which passes around and is driven by a pulley 63, the latter being fixed to the spindle 16 on which the lower spool for the finger-print tape is wound. By this arrangement, each step in the rotation of this lower spool, imparted thereto by the pawl 50, causes a corresponding extent of rotation to the pulley 63 and through the belt 62 and pulley 61, imparts rotation to the roll 58 to feed from the roll 56 a length of the ticket strip 55 corresponding to the length of a ticket.

The operation of inserting a coin is also utilized to effect severance of a length of the ticket strip corresponding to a ticket for each coin inserted. Such severing means comprises, in the present instance, a fixed knife 65 and a cooperative movable knife 66, the ticket strip being fed downwardly between these knives by the rollers 57 and 58. The movable knife 66 is connected to a slide 67 mounted to reciprocate on a guide 68 suitably mounted in a fixed position within the casing, the slide being provided with a rack 69 which meshes with a gear 70. The gear 70 is fixed on a shaft 71 journaled in suitable bearings 72 fixed in the casing, and the shaft 71 also has a pinion 73 which is fixed thereon and meshes with a gear 74 fixed on a shaft 75 journaled in bearings 76 fixed in the casing. The shaft 75 has a gear 77 fixed thereon, this gear meshing with a rack 78 carried by a slide 79 which is mounted to reciprocate on a guide 80 fixed in the casing in a position to support the slide for movement forwardly and rearwardly toward and from the aperture 13, this slide being returned to and normally held in its forward position by a compression spring 81. The slide 79 is located approximately in a plane which includes the lower edge of the aperture 13, and is provided with a slot 82 in which the lower end of the arm 45 swings, and a pin 83 extends across the slot 82 in a position to be engaged by the leading edge of a coin as it is inserted through the slot in the finger-print tape, whereby the slide 79 will be pushed back as the coin is pushed through the tape. The consequent rearward movement imparted to the slide 79 will cause it to act, through the rack 78, gears 77, 74, 73 and 70 and rack 69, to move the slide 67 and the knife 66 thereon rearwardly, thereby severing the ticket strip 55 which extends between the knives. Return of the slide 79 to its normal position under the action of the spring 81 acts, through the racks and gears just described, to return the slide 67 and knife 66 to their forward position, thereby opening the knives for the reception of another length of the ticket strip.

As shown diagrammatically in Fig. 6, as the coin X is pushed through the slot in the tape 21, it first rocks the lower end of the arm 45 rearwardly, and as the insertion of the coin proceeds, it engages the pin 83 on the slide 79 and rolls rearwardly on the lower edge of the coin receiving aperture 13 until the pawl 50 has engaged the next tooth of the ratchet wheel 25 and the slide 79 has been pushed rearwardly sufficiently to complete the ticket-severing movement of the knife 66. Further movement of the coin during its insertion causes it to drop from between the lower edge of the coin receiving aperture and the pin 83, and the coin is deflected in its fall by an inclined wall 85 which directs the coin into a suitable coin receptacle 86 which is accessible to an authorized attendant by opening the door 12. Release of the coin from the arm 45 and slide 79 permits these parts to return to their normal positions under the action of their respective springs.

The ticket severed from the ticket strip drops onto an inclined plate 87 which directs it to the opening 14 through which it may be removed by the individual who inserted the coin to effect the delivery of that ticket.

The ticket 88, as shown in Fig. 10, may have a space 89 to receive the address of the ticket purchaser, a space 90 to contain instructions to the finder of the injured ticket purchaser or his body and other pertinent data, and the reverse side of the ticket may have the insurance contract printed thereon. Each ticket bears a serial number which preferably appears two or three times on each ticket, these serial numbers being consecutive on the tickets on the strip and each ticket preferably also bears a number corresponding, for example, with the serial number of the machine which is to issue it, and may also have letters or other data associated with the serial number to designate the area, zone and location of the machine from which the ticket was issued so that this particular machine may be readily located in the event a claim is made under an insurance policy represented by the ticket, and the spool 20 for such machine and containing a tape 21 having thereon the finger print of the individual to whom the ticket was issued removed for identification or other purpose, each tape spool 20 to which the respective tape is permanently fastened also bearing the serial number of the machine in which it is used, as indicated at 91 in Fig. 2. For example, the letter "A" on the ticket may designate the city in which the machine issuing the ticket is located, the numeral "2" may designate the zone in said city, the letter "B" may designate the railroad or bus terminal in which the machine is located, and the following numeral "4" may designate the gate at such terminal at which the machine is located. The characters or numerals 66 may correspond with the serial number of the machine in which the ticket strip is placed and the numerals and letters R3T2 may represent the serial number of the particular ticket.

A suitable number of shelves 95 are provided within the casing to form compartments 96 which are accessible to the authorized attendant by opening the door 12, these compartments being adapted to receive spools of tape on which finger-prints have been recorded.

After a tape spool 20 having finger prints recorded thereon has been stored in one of the compartments for a sufficient length of time, it may be placed on the lower spindle 16 and, while the pawls 26 and 50 are disengaged from the ratchet wheel 25, the exposed tape may be rewound on the spool 19 on the upper spindle 15, and during such rewinding, the finger-prints on such tape may be erased or removed by placing a receptacle 97 containing a suitable cleaning fluid and having a wick 98, in inverted position in a suitable spring clip 97a so that the wick will apply the cleaning fluid to the tape and thus wash or remove the finger prints therefrom. While the machine is in operation, the receptacle 97 is placed in upright position, with its wick out of contact with the tape. By so removing the finger prints from the tape, it is unnecessary to remove the tapes from the machine for such purpose.

When the machine is in condition for operation, the spool 19 having a finger-print recording tape 21 wound thereon is mounted on the upper spindle 15 and a spool 20 to which the other end of the tape is attached is mounted on the lower spindle 16, the portion of the tape extending between the spools being threaded past the idler rollers, as hereinbefore described, so that the tape will lie immediately behind the aperture 13 and shutters 31. Also, a roll 56 of a ticket strip is mounted on the spindle 56a, its free end being extended down between the severing knives 65 and 66. Each of the spools 20 carrying the finger-print recording tape, like the ticket tape, bears a number corresponding with the serial number of the machine in which these spools are used, and these spools may also include location designating indicia corresponding with those on the tickets of the ticket tape.

Normally, the shutter members 31 will be closed and held in such position by the spring 47 which acts thereon through the coin-operated arm 45 and the racks and gearing connecting it to the shutter members, and the knife 66 will be held in its retracted position by the spring 81 which presses the slide 79 forwardly and normally holds it in its forward position and the racks and gearing hereinbefore described, which connect said slide with the knife slide 67.

Upon insertion of a proper coin edgewise through the aperture 13 at the entrance of the coin-controlled mechanism, the shutter slot 33 in the shutter which is then presented to said aperture, and the slot 30 in the finger-print tape, and against the forward lower end of the arm 45, and pressing upon the coin with the thumb or other finger, the lower end of the arm 45 is rocked rearwardly against the action of its spring 47, thereby causing the gear 38 connected to said arm to rotate in a direction to raise the upper shutter member and lower the lower shutter member through the racks 34 and 35 and gears 36, 37 and 47 driven by the gear 38. The shutter members are thus retracted or opened, exposing the portion of the tape 21 which lies immediately behind the aperture 13, so that the final part of the operation of inserting the coin brings the thumb or finger into contact with such exposed portion of the tape 21, and the latter thereby receives and records the finger print of the person inserting the coin. If the coin is not pushed in sufficiently to bring the thumb into contact with the tape, the coin will be held between the pin 83, the lower end of the arm 45 and the lower edge of the coin receiving aperture 13, thus holding the shutters open and thereby informing the purchaser that the coin must be pushed in further.

During the latter part of the coin inserting operation, the lower edge of the coin rides over the lower edge of the coin receiving aperture 13 and the coin continues to swing back the lower end of the arm 45 and presses against the pin 83 on the slide 79, thereby pushing this slide inwardly against the action of the spring 81 and operating through the racks 69 and 78 and gears 70, 73, 74 and 77 to advance the knife 66 toward and against the portion of the ticket strip 55 extending between the knives 65 and 66, thereby severing a ticket from the ticket strip, the severed ticket dropping onto the incline 87 from which it may be removed through the opening 14 by the person who inserted the coin. The tickets are severed from the ticket strip on such lines that each ticket will bear two or three numbers. The final part of the inward movement of the slide 79, which takes place immediately after the thumb or finger has pushed the coin through the slot in the tape 21, is produced by pressure of the finger or thumb of the person inserting the coin against said tape, which makes a finger-print impression thereon and completes the inward movement of the slide, thereby permitting the coin to drop by gravity from between the pin 83 and the lower edge of the coin receiving aperture and into the coin receptacle, assisted by the arm 45 which is released by the coin. The slide 79 is then released so that it will return to its normal forward position and, through its rack and gear connection with the knife slide 67, will retract the knife 66 and thus admit another ticket section of the ticket strip between the knives, and the arm 45 operates to bring a fresh section of the tape into position for exposure.

Since each ticket bears a number which corresponds with the serial number of the machine which issued it, and with the serial number on the spool 20 to which the finger print tape is attached, and the finger prints will be recorded on the tape in the order in which the serially numbered tickets are issued, each finger print recorded on the tape will constitute an identification of the person who deposited the coin to secure the respective ticket, and may be used as proof thereof. Also, by providing the tickets with indicia denoting the location of the machines which issued them, the machine which issued any given ticket, and which contains a record of the finger-print of the purchaser thereof, may be readily found.

In the event a finger-print tape is filled with finger prints before a fresh tape is substituted, the blank end of the tape will be presented to the aperture 13, and due to the absence of the slot adjacent the end of the tape, a coin can not be inserted, the intended purchaser being thereby informed that the machine is not in working order.

In using the machine for vending tickets representing or constituting insurance policies underwriting the purchasers thereof against accident or death; it is preferable to provide each machine with three or more rolls 20 of finger-print tape for use on consecutive days, the rolls not in use being stored on the shelves 95, and to have the machines attended daily and the progress of the finger-print tape noted. The attendant each day may first wind up the tape on the spool 20 mounted on the lower spindle 16 and containing the finger-prints received during the previous day or other period, and place on the lower spindle 16 another spool 20 of the earliest exposed tape from one of the shelves in the machine and containing the finger prints of persons who purchased tickets but against which no claim has been made within a given time such as may be stipulated on the ticket or policy, the tape being threaded around the idler rollers 26, 27, 28 and 29 and attached to a spool on the upper spindle 15 by the lug 22, and the receptacle 97 containing a cleaning fluid may be inverted so that its wick 98 bears on the tape. The tape is then wound from the lower spool 20 to the upper spool 19 by the attendant while the pawls 26 and 50 are disengaged from the ratchet wheel 25, and during this operation, the wick applies cleaning fluid to the tape to remove the finger-prints recorded thereon. The receptacle 97 is then placed in upright position, and the machine is ready for operation. The attendant himself may then purchase the first ticket for that day and stamp the date and time of such purchase on the ticket and file the ticket in the machine for use as evidence if a claim should be made later on a ticket issued by the machine during that day. If it appears to the attendant that a tape on the spool 20 which is in use will be used up before the end of a given period, such tape may be wound up on this spool, after the attendant purchases a policy and dates and files it, and deposited on a shelf within the machine, and another spool 20 of the tape may be mounted on the spindle 16, and the tape rewound therefrom onto the spool 19 on the spindle 15, the finger prints on the tape being erased therefrom during such rewinding in the manner hereinbefore described. The spool 20 on the spindle 16 the tape on which contains the finger-prints for a given day, or which has been filled with finger-prints, is removed from said spindle and placed on one of the shelves in the machine for storage until the time has expired in which a claim might be made under any of the tickets or policies issued to the persons whose finger-prints are recorded on such tape, and another spool 20 is removed from one of the shelves and placed on the spindle 16, and rewound on the spool 19, and the finger-prints erased therefrom, as previously described, thus placing the machine in condition for operation.

In a small community where traffic is relatively light, and only a few tickets or policies are purchased each day, daily or other frequent changing of the finger-print tapes would not be necessary. In such cases, the ticket agent at the railroad or bus terminal or a local resident could act as agent for the insurance company, and could himself purchase a ticket each day on behalf of the insurance company, and mark on the tickets the dates and hours of purchase thereof. Such a procedure would establish the day on which each serially numbered ticket issued by such machine was purchased, and the serial numbers on the tickets would show the number thereof which was purchased each day.

The insurance company underwriting the policies represented by the ticket issued by the machines may list each day the ticket numbers in use each day in the various machines. As each ticket will bear a symbol indicating which machine issued it, the insurance company will be able to ascertain from any given ticket the day on which such ticket was purchased, what particular machine issued it and on which tape in the machine and approximately the position on such tape on which the identifying finger-print of the purchaser of such ticket is recorded. As each ticket also contains indicia giving the location of the particular machine which issued the ticket, a messenger can proceed to immediately remove such tape and its spool from that particular machine and to substitute another tape and spool, if a claim is made within a prescribed period under any ticket issued, thus obtaining evidence upon which payment or non-payment of a claim under such ticket may be based. Ordinarily, however, the finger-print tapes and their spools will remain in each machine to which they belong until a claim is made under a ticket issued by the machine.

Although it will be apparent that the invention may be used to especial advantage when applied to machines for vending or issuing tickets representing or constituting insurance policies, it is to be understood that the invention is not limited thereto as it may also be employed in connection with coin-controlled machines for vending or issuing tickets for other purposes or having other significance, wherein it is desired to record the identifying finger-prints of the persons inserting the coins and to whom the tickets are issued.

I claim:

1. In a vending machine, the combination with means having an entrance for edgewise insertion of a coin under pressure of a finger for controlling the operation of the machine, of a tape extending past said entrance sufficiently close thereto to receive thereon a finger-print from and under the pressure of such finger in inserting a coin in said entrance.

2. In a vending machine, the combination with means having an entrance to receive a coin for controlling the operation of the machine, of a tape extending across said entrance and having a slot for the insertion of a coin therethrough, said tape being positioned sufficiently close to said entrance to receive a finger-print from and under the pressure of a finger in inserting the coin.

3. In a vending machine, the combination of means having an entrance for edgewise insertion of a coin for controlling the operation thereof and for reception of a portion of the finger of a person inserting such coin, means sufficiently close to said entrance to be engaged by and to receive a finger-print of the finger of a person inserting such coin therein, and means controlled by an inserted coin for closing the finger receiving portion of said entrance.

4. In a vending machine, the combination of means having a coin entrance for controlling the operation thereof, a medium positioned sufficiently close to said entrance to be engaged by and to receive a finger-print of a person inserting a coin therein, and a shutter normally covering said medium and having means controlled by insertion of a coin in said entrance for opening the shutter and exposing said medium.

5. In a vending machine, the combination of means having a coin entrance to receive a coin for controlling the operation of the machine, and a slotted medium extending past said entrance for the insertion of a coin therethrough and located sufficiently close to said entrance to receive a coin therefrom and to receive a finger-print of the finger inserting such coin in said entrance.

6. In a vending machine, the combination of means having a coin entrance to receive a coin for controlling the operation of the machine, a slotted medium extending past said entrance for the insertion of a coin therethrough and located sufficiently close to said entrance to receive a coin therefrom and to receive a finger-print of the finger inserting such coin in said entrance, and a slotted shutter normally covering said medium and through which such coin is insertible, and having means controlled by the insertion of such coin for opening it.

7. In a vending machine, the combination of means having a coin entrance for controlling the operation of the machine, a tape having a portion exposed at said entrance and positioned to be engaged by and to receive a finger-print from a finger inserting a coin in said entrance, and means controlled by the insertion of a coin to advance the tape to bring another portion thereof for exposure at said entrance.

8. In a ticket issuing machine, the combination of means having a coin entrance for controlling the issuance of the tickets, a tape adapted to receive finger-prints, means for supporting the tape for movement past said entrance to expose successive portions thereof at said entrance, said tape being located sufficiently close to said entrance to contact with and to receive a finger-print from a finger inserting a coin in said entrance, and means controlled by the insertion of a coin for advancing the tape and effecting issuance of a ticket.

9. In a ticket issuing machine, the combination of ticket issuing mechanism, means having an entrance for edgwise insertion of a coin for controlling the operation of said mechanism, a medium movable past said entrance to expose successive portions at said entrance, said medium being positioned sufficiently close to said entrance to be engaged by and to receive a finger-print from a finger inserting a coin in said entrance, and means controlled by the insertion of a coin in said entrance for advancing said medium.

10. In a ticket issuing machine, the combination of ticket issuing mechanism, means having a coin entrance for controlling the operation of said mechanism, a medium movable past said entrance to expose successive portions at said entrance, said medium being located sufficiently close to said entrance to be engaged by and to receive a finger-print from a finger inserting a coin in said entrance, means controlled by the insertion of a coin in said entrance for advancing said medium, and means operated by said medium advancing means for effecting the issuance of tickets by said mechanism.

11. In a ticket issuing machine having a coin entrance, a tape extending past said entrance sufficiently close thereto to receive a finger-print from a finger inserting a coin in said entrance, means for winding the tape into a roll and thereby advancing it to present successive portions thereof to said entrance, and means including a member actuated by a coin inserted in said entrance for causing operation of said winding means.

12. In a ticket issuing machine, the combination of means for supporting a ticket strip, means having a coin entrance for causing severance and delivery of tickets successively from said strip under control of coins inserted successively in said entrance, a tape extending past said entrance sufficiently close thereto to be contacted by and to receive a finger-print from a finger inserting a coin in said entrance, and means controlled by insertion of a coin in said entrance for causing advance of the tape to present successive portions to said entrance.

13. In a vending machine, the combination of a pair of spindles, a tape adapted to receive finger-prints, means supported on the respective spindles for unwinding the tape from one roll and winding it into another roll, means having a coin entrance for controlling operation of the machine, means for guiding the tape to travel past said entrance in close proximity thereto to expose successive portions of the tape thereto and to contact with the tip of a finger inserting a coin in said entrance and receive a finger-print therefrom, and means including a member operative by a coin inserted in said entrance for causing successive operations of the tape winding means.

14. In a vending machine according to claim 13, wherein said tape unwinding and winding means comprise a pair of spools, and said means for causing successive operations of the tape winding means comprises ratchet and pawl mechanism actuated by said member and cooperative with one of said spools.

15. In a vending machine having an aperture for the insertion of coins to control operation thereof, the combination of coin-controlled mechanism, a tape guided to travel past said aperture and having a slot extending longitudinally thereof for the insertion of a coin therethrough to the coin controlled mechanism, said tape being positioned sufficiently close to said aperture to receive a finger-print of a finger inserting a coin through said aperture and slot in the tape, an end portion of the tape being un-slotted to prevent such insertion of a coin, a shutter normally closing said aperture and having a slot for the insertion of a coin therethrough and through the slot in the tape, and means operative by a coin inserted through said slots for causing opening of the shutter.

16. In a ticket issuing machine, the combination of means for delivering consecutively numbered tickets from a strip, means having a coin entrance for controlling said ticket delivering means, means for supporting and advancing past said entrance a tape positioned sufficiently close to said entrance to receive a finger-print from a finger inserting a coin in the coin entrance, and means controlled by the insertion of a coin in said entrance for advancing the tape to receive consecutively thereon finger-prints of the persons inserting the coins and to whom the respective tickets are issued.

PHILIP B. RICHARDSON.

REFERENCES CITED

The following references are of record in the file of this patent:

UNITED STATES PATENTS

| Number | Name | Date |
|---|---|---|
| 923,532 | Jones | June 1, 1909 |
| 1,265,339 | Jones | May 7, 1918 |
| 1,849,295 | Hall | Mar. 15, 1932 |
| 1,855,200 | Reichert | Apr. 26, 1932 |
| 2,020,376 | Rich | Nov. 12, 1935 |
| 2,215,004 | Knox | Sept. 17, 1940 |